United States Patent [19]

van der Eerden

[11] Patent Number: 4,653,147
[45] Date of Patent: Mar. 31, 1987

[54] DEVICE FOR SEVERING A BODY PART OF SLAUGHTERED POULTRY

[75] Inventor: Henricus F. J. M. van der Eerden, Boxtel, Netherlands

[73] Assignee: Stork PMT B.V., An Boxmeer, Netherlands

[21] Appl. No.: 720,674

[22] Filed: Apr. 8, 1985

[30] Foreign Application Priority Data

Apr. 9, 1984 [NL] Netherlands .......................... 8401125

[51] Int. Cl.⁴ ............................................ A22C 21/00
[52] U.S. Cl. ............................................ 17/11; 17/12; 83/597
[58] Field of Search .................... 17/11, 11 B, 12, 52, 17/61, 63; 83/597

[56] References Cited

U.S. PATENT DOCUMENTS

| 2,466,489 | 4/1949 | Silfen | 17/12 |
| 2,926,383 | 3/1960 | Steck | 17/12 |
| 3,233,280 | 2/1966 | Loftus | 17/11 |
| 4,468,838 | 9/1984 | Sjostrom et al. | 17/11 |

*Primary Examiner*—Willie G. Abercrombie
*Attorney, Agent, or Firm*—Newton, Hopkins & Ormsby

[57] ABSTRACT

A device for severing a body part of slaughtered poultry in which use is made of a cutting element provided with a cutting edge in which the desired cutting place is positioned relative to the cutting edge by at least one positioning member coupled thereto and is subsequently cut through by the cutting edge moving relative to the bird.

2 Claims, 2 Drawing Figures

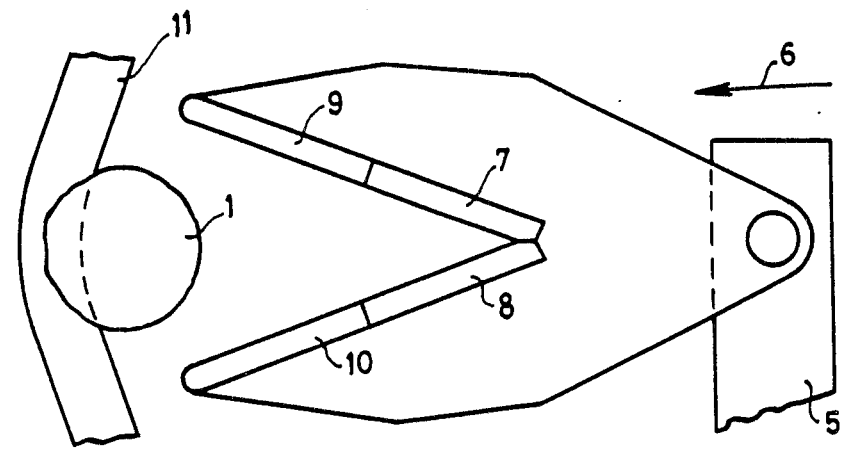
FIG: 1.
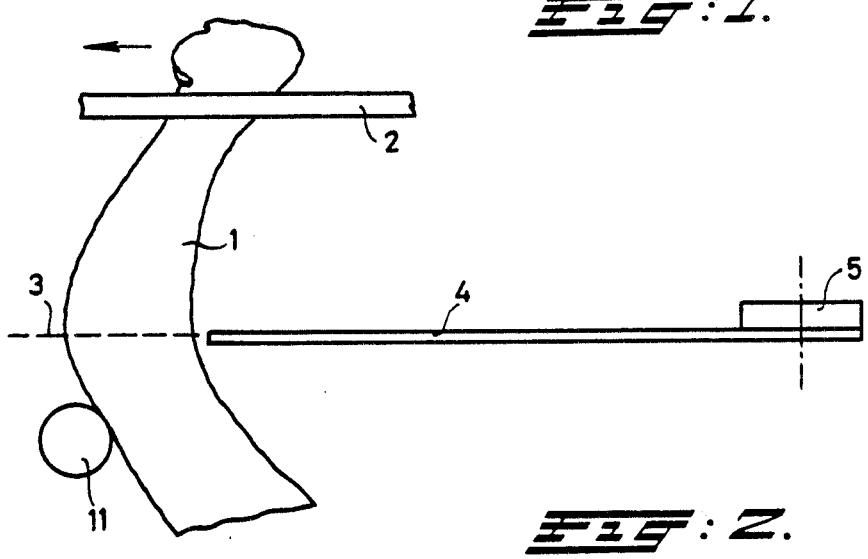
FIG: 2.

DEVICE FOR SEVERING A BODY PART OF SLAUGHTERED POULTRY

BACKGROUND OF THE INVENTION

The invention relates to a device for severing a body part of slaughtered poultry in which use is made of a cutting element provided with a cutting edge.

DESCRIPTION OF THE PRIOR ART

Body parts, such as legs, wings and neck, of slaughtered poultry are usually severed by means of one or more stationary, often rotating cutting knives along which the parts to be severed are passed. This requires very exact positioning of these parts relative to the cutting element, which cannot always be realized equally well: problems arise in particular when birds of different dimensions have to be processed. Furthermore, the positioning of certain parts, for example the transition between wing and trunk, relative to a stationary, rotating cutting knife is difficult.

SUMMARY OF THE INVENTION

The invention aims at providing a device by means of which these disadvantages are overcome. According to the invention, the desired cutting place is positioned relative to the cutting edge by at least one positioning member coupled thereto and is subsequently cut through by the cutting edge moving relative to the bird.

In this procedure, the cutting element can execute a movement to overtake the bird while the method can also be carried out such that the parts to be separated from one another execute no movement or virtually no movement during the severing operation.

A device for carrying out this method is characterised, according to the invention, by a positioning member, coupled to the cutting element, for positioning the bird part relative to the cutting edge before the part is cut through by the cutting edge.

According to the invention, the cutting operation is thus carried out by a cutting element which moves relative to the bird and is coupled to a positioning member such that during the movement of the entire arrangement relative to the bird the latter is brought into the correct position relative to the cutting edge by the positioning member.

Poultry is frequently moved forward, on a conveyor track, to be subjected to processing operations. According to the invention, a cutting element is then employed which has a movement component in the direction of transport and of which the velocity during cutting is greater than that of the part to be cut.

An advantageous embodiment according to the invention is characterised by a V-shaped cutting element, the cutting edges of which are located on either side of and near the apex and having non-cutting positioning edges which are located in the direction of movement of the cutting element in front of the latter.

DESCRIPTION OF THE DRAWINGS

FIG. 1 is a top view of a first possible embodiment according to the invention;

FIG. 2 is a side view thereof.

DESCRIPTION OF A PREFERRED EMBODIMENT

Reference numeral 1 in FIGS. 1 and 2 indicates the leg of a bird hanging on the conveyor track 2, which leg has to be cut through at the position shown with broken lines 3. For this purpose use is made according to the invention of a cutting knife 4 which is fastened to a pivot arm 5 and is driven in the direction of arrow 6; the cutting knife has two cutting edges 7, 8 which, in the direction of movement 6, are preceded by two non-cutting positioning edges 9, 10. As a result of the presence of these positioning edges 9, 10 the leg 1 which is held back by the support 11 can be positioned relative to the cutting edges 7,8 whereby the cut is made at the desired position.

What is claimed is:

1. A cutting device, in combination with a conveyor track, for cutting poultry parts by severing a joint between two bones while the poultry part is suspended from and in transport on the conveyor track comprising:

a cutting element having a cutting edge and a positioning edge, means for advancing the element toward the trailing side of the poultry part, said positioning edge locating said part relative to the cutting edge, and a support means positioned downstream and in the path of the poultry part to temporarily secure the poultry part during severing.

2. The device of claim 1 wherein the cutting element further comprises a V-shaped edge, the outwardly diverging ends having non-cutting positioning edges, and the apex having situated therein correspondingly V-shaped cutting edges which extend outwardly over a portion of the V-shaped edge.

* * * * *